United States Patent [19]

Flaherty

[11] Patent Number: 4,655,629
[45] Date of Patent: Apr. 7, 1987

[54] FLEXURAL PIVOT DEVICE AND METHOD FOR ASSEMBLING SAME

[75] Inventor: Robert Flaherty, Pittsburgh, Pa.
[73] Assignee: Westinghouse Electric Corp., Pittsburgh, Pa.
[21] Appl. No.: 702,769
[22] Filed: Feb. 19, 1985
[51] Int. Cl.[4] .......................... G01C 19/22; F16F 1/18
[52] U.S. Cl. ...................................... 403/291; 74/5 F; 267/160
[58] Field of Search ............... 308/2 R, 2 A; 148/402; 428/960; 267/160; 74/5 F; 403/291, 220, 121; 464/100

[56] References Cited

U.S. PATENT DOCUMENTS

| | | | |
|---|---|---|---|
| 3,073,584 | 1/1963 | Troeger | 267/1 |
| 3,181,918 | 5/1965 | Troeger | 308/2 |
| 3,188,071 | 6/1965 | Owen | 267/1 |
| 3,252,696 | 5/1966 | Friedel | 267/1 |
| 3,277,555 | 10/1966 | Kutash | 29/149.5 |
| 3,413,858 | 12/1968 | Samet | 74/5 |
| 3,544,175 | 12/1970 | Tooker | 308/2 |
| 3,703,831 | 11/1972 | Schauffler | 74/5 |
| 3,722,296 | 3/1973 | Hurlburt et al. | 74/5 |
| 3,825,992 | 7/1974 | Troeger | 29/436 |
| 4,010,455 | 3/1977 | Stange | 340/224 |
| 4,244,140 | 1/1981 | Kim | 46/145 |
| 4,261,211 | 4/1981 | Haberland | 74/5 |
| 4,269,072 | 5/1981 | Duncan | 74/5 |
| 4,405,184 | 9/1983 | Bahiman | 308/2 A |
| 4,424,865 | 1/1984 | Payton, Jr. | 166/302 |
| 4,438,655 | 3/1984 | Quermann | 74/5 |

FOREIGN PATENT DOCUMENTS 1180782 2/1970 United Kingdom .
2106190 4/1983 United Kingdom .
845007 7/1981 U.S.S.R. .

OTHER PUBLICATIONS

Bendix Corp. Brochure Entitled: Suggested Methods of Mounting Free Flex Pivots.
Bendix Corp. Brochure Entitled: Free Flex Flexural Pivot Engineering Data; Publication No. 19U-6-718A.
Bendix Corp. Brochure Entitled: Bendix Flexural Pivot; Publication No. 00U-6-7111A.

Primary Examiner—John M. Jillions
Assistant Examiner—David Werner
Attorney, Agent, or Firm—L. A. DePaul

[57] ABSTRACT

A flexural pivot device and method for producing same, wherein rotational motion of a first tubular member relative to a second tubular member is obtained by: forming flexural members from a shape memory alloy into a first shape in the austenitic phase at a first temperature; cooling the flexural members into the martensitic phase at a second temperature; forming the flexural members into a second shape; installing the flexural members between the first and second tubular members; and recreating the first temperature, thus returning the flexural members to the first shape in the austenitic phase and rotating the second tubular member relative to the first tubular member.

4 Claims, 3 Drawing Figures

FLEXURAL PIVOT DEVICE AND METHOD FOR ASSEMBLING SAME

BACKGROUND OF THE INVENTION

1. Field of the Invention

This invention relates to mechanisms providing limited relative rotation between a stationary element and a movable element and, more particularly, to flexural pivot devices having movable flexural members, such as flat springs, connecting the stationary element and the movable element for relative rotation.

2. Description of the Prior Art

In certain mechanisms, such as needle galvanometers, gyroscopes and pressure transmitters, where pivoting of some element through a small angle with very low and very reproducible resistance is required, flexural pivot devices have been used. Examples of flexural pivot devices are described in U.S. Pat. No. 3,277,555, issued to KUTASH, U.S. Pat. Nos. 3,073,584, 3,181,918 and 3,825,992, issued to TROEGER and U.S. Pat. No. 3,722,296, issued to HURLBURT et al.

Each of these flexural pivot devices uses flexural members which are crossed, flat springs made of steel, a material which is ultimately subject to fatigue due to elastic deformation. Accordingly, the allowable loading of flexural pivot devices using steel springs must be reduced approximately 50% to extend their useful life from 35,000 cycles to "indefinite". The useful life for any load is further reduced as the angular deflection, i.e., bending stress, is increased. More simply, where steel springs are used, the useful life decreases due to fatigue effects as the load and/or angular deflection is increased.

In contrast to steel, there is a host of alloys, called "shape memory" alloys, which do not exhibit fatigue because they deform plastically. When a shape memory alloy is annealed at a very high temperature (typically 550° C. or above) in a given shape, the shape is fixed permanently, known as the "austenitic phase," unless it is annealed once again. If the shape memory alloy is cooled down below a certain temperature (typically 45° C.–80° C.), known as the "transition temperature," it becomes quite weak mechanically, known as the "martensitic phase," and can be deformed relatively easily. After deformation, if the temperature of the alloy is again raised above the transition temperature, the crystal structure of the alloy changes from the martensitic phase to the austenitic phase and the alloy recovers its originally fixed shape. Both the annealing temperature and the transition temperature depend on the particular shape memory alloy chosen.

An example of a shape memory alloy is Nitinol which is made substantially of 55% nickel and 45% titanium. Nitinol exhibits good strength and ductility and is characterized by an 8% shape recovery. Other shape memory alloys are, for example, 52.5% Au - 47.5% Cd; 80% In - 20% Tl; and various combinations of Cu, Zn, Al and Ni.

Although shape memory alloys, such as Nitinol, have been used in certain products such as toys (see U.S. Pat. No. 4,244,140, issued to KIM), heavy machinery (see U.S. Pat. No. 4,010,455, issued to STANGE) and oil well sealing caps (see U.S. Pat. No. 4,424,865 issued to PAYTON, JR.), shape memory alloys have heretofore not been used in devices capable of effecting relative rotation, for example, flexural pivot devices.

Thus, although the prior art flexural pivot devices described above using steel springs have been reasonably effective, these prior art flexural pivot devices are not capable of an indefinite useful life over a wide range of loads and angles of deflection.

SUMMARY OF THE INVENTION

Accordingly, it is an object of the present invention to provide a rotational device having flexural members which are not subject to fatigue.

It is another object of the present invention to provide a flexural pivot device having an indefinite useful life over a wide range of loads and angular deflections.

It is another object of the present invention to provide a flexural pivot device having flexural members made of a non-fatigue, shape memory alloy, such as Nitinol.

It is another object of the present invention to provide a flexural pivot device having shape memory alloy flexural members which can be actuated by thermal input.

Finally, it is an object of the present invention to provide a method for producing a non-fatigue rotational device, such as a flexural pivot device, satisfying the above objects.

To achieve the foregoing and other objects of the present invention, and in accordance with the purpose of the invention, there is provided a flexural pivot device and a method for producing same, wherein the flexural members are made from a shape memory alloy, such as Nitinol, and can be thermally actuated. Each flexural member is a spring which is first deformed and stabilized into a curved configuration in the austenitic phase. The curved austenitic springs are then cooled to transform them into the martensitic phase. These martensitic springs are then flattened and installed in a flexural pivot device with the potential curvatures of the springs facing in opposite directions.

The present invention, as described above, generates motion between two angular positions with thermal input, i.e., electrical resistance heating, warm gas heating and/or gas cooling. That is, the flexural pivot device can be caused to rotate in one direction by heating a first flexural member, which then returns to its "remembered", curved, austenitic configuration. The second, non-heated flexural member remains in the low strength, martensitic phase and is bent to follow the pivoting motion of the flexural pivot device. The flexural pivot device can then be rotated to its other extreme position by chilling both flexural members, which return to the martensitic phase, and then warming the second flexural member into the austenitic phase.

Compared to prior art flexural privot devices, the present invention provides reliable, limited angular motion (typically ±30°) without the wear or fatigue effects characteristic of the prior art.

BRIEF DESCRIPTION OF THE DRAWINGS

The accompanying drawings, which are incorporated in and constitute a part of the specification, illustrate embodiments of the invention and, together with the description, serve to explain the principles of the invention.

DESCRIPTION OF THE PREFERRED EMBODIMENTS

Figure 1:
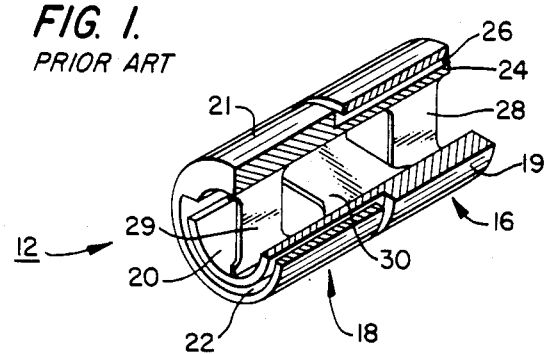
FIG. 1 is a perspective, cross-sectional view of a conventional flexural pivot device, illustrating particularly the positions of the respective flexural members within such a device.

As stated above, a typical flexural pivot device is described in the above-referenced U.S. Pat. No. 3,722,296, issued to HURLBURT et al. and is also illustrated in FIG. 1 herein. The device of FIG. 1 will be described hereafter for the purposes of contrasting the present invention; however, it is to be understood that the present invention is not limited to the specific type of flexural pivot device shown in FIG. 1. For example, even though a conventional "cantilever" type of flexural pivot device is shown in FIG. 1, the flexural pivot device of the present invention can also be a "double ended" type of flexural pivot device, which is also known in the art.

Referring to FIG. 1, there is indicated generally by the reference numeral 12 a conventional flexural pivot device which is designed to carry radial and axial loads with low torsional stiffness in the angular displacement of operative parts 16 and 18 relative to each other.

The operative part 16 of the flexural pivot device 12 comprises an outer tubular sleeve portion 19 connected to an inner tubular sleeve portion 20 which projects in slidable relation into an arcuate recess 22 formed in an inner surface of the operative part 18. The arcuate recess 22 permits limited angular movement therein of the inner tubular sleeve portion 20 relative to the operative part 18.

The operative part 18 similarly comprises an outer tubular sleeve portion 21 connected to an inner tubular sleeve portion 24 which projects in slidable relation into an arcuate recess 26 formed in an inner surface of the operative part 16. The arcuate recess 26 permits limited angular movement therein of the inner sleeve portion 24 relative to the operative part 16.

The flexural pivot device 12 also includes a pair of flat steel springs 28 and 29 extending in parallel spaced relation. As known in the art, springs 28 and 29 could instead be configured as a single spring by merely joining the tops and bottoms thereof as described in U.S. Pat. No. 3,277,555, issued to KUTASH.

The flat steel spring 28 is securely bonded between the inner surface of the portion 19 of the operative part 16 and the inner surface of the portion 24 of the operative part 18. Similarly, the flat steel spring 29 is securely bonded between the inner surface of the portion 21 of the operative part 18 and the inner surface of the portion 20 of the opposite operative part 16.

Furthermore, a third flat steel spring 30 extends between and in an orthogonal crossed spring relation to the flat steel springs 28 and 29. The flat steel spring 30 is securely bonded at one end to the inner surface of the operative part 16, while the opposite end thereof is securely bonded to the inner surfaces of the operative part 18.

As discussed above, the steel springs 28, 29 and 30 eventually become fatigued during operation, especially if the load or angular deflection is large. Accordingly, the useful life of the conventional flexural pivot device is limited.

In contrast to the prior art, steel flexural members 28, 29 and 30 discussed above, the flexural members 32 and 34 for the flexural pivot device of the present invention will now be described.

Figure 2:
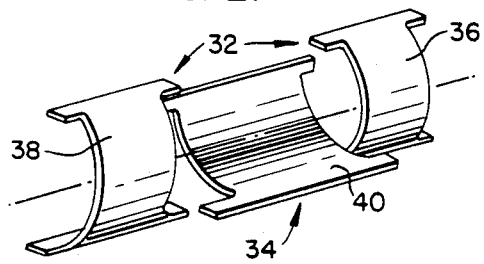
FIG. 2 is a perspective view of the flexural members in the austenitic phase for the flexural pivot device according to the present invention.

As shown in FIG. 2, the flexural members 32 and 34 of the present invention are first deformed and stabilized in the austenitic phase to a curvature which represents not more than 4% extension of the outermost fibers when flattened. The curved flexural members 32 and 34 are then cooled to transform them into the martensitic phase, flattened, and installed in the flexural pivot device shown in FIG. 3 with the potential curvatures of the flexural members 32 and 34 facing in opposite directions.

Figure 3:
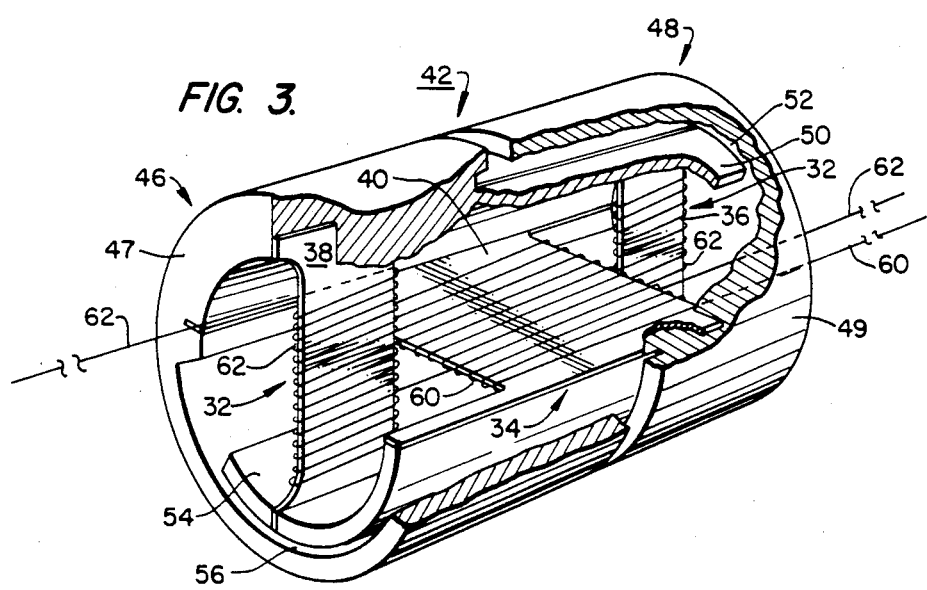
FIG. 3 is a perspective, partial, cross-sectional view of the flexural pivot device of the present invention, illustrating particularly the positions of the installed flexural members while in the martensitic phase.

Referring in greater detail to FIG. 3, there is indicated generally by the numeral 42 the flexural pivot device of the present invention. A first operative part 46 comprises an outer tubular sleeve 47 connected to an inner tubular sleeve portion 50 which projects in slidable relation into an arcuate recess 52 formed in an inner surface of the second operative part 48. The outer tubular sleeve 48 similarly includes an outer tubular portion 49 connected to an inner tubular sleeve portion 54 which projects in slidable relation into an arcuate recess 56 formed in an inner surface of the operative part 46. The arcuate recess 56 permits limited angular movement therein of the inner sleeve portion 54 relative to the operative part 46.

The flexural pivot device 42 also includes the flexural member 32 comprising a pair of flat steel springs 36 and 38 extending in parallel spaced relation, as described above in regard to FIG. 2. The flattened spring 36 is securely bonded between an inner surface of the outer portion 49 of the operative part 48 and an inner surface of the inner portion 50 of the operative part 46. On the other hand, the flattened spring 38 is securely bonded at one end to an inner surface of the outer portion 47 of the operative part 46 and an inner surface of the inner portion 54 of the operative part 48.

Furthermore, as shown by FIG. 3, the second flexural member 34 comprises a third flattened spring 40 (also described above in relation to FIG. 2) extending between and in an orthogonal crossed spring relation to the flat springs 36 and 38. The flattened spring 40 is securely bonded between the inner surface of the operative part 46 and the inner surface of the operative part 48.

The flexural pivot device 42 according to the present invention, as shown in FIG. 3, is caused to rotate in either direction by selectively applying thermal input to the appropriate flexural member 32 or 34. For example, if flexural member 32 is heated, flexural member 32 is caused to return to its "remembered" curved configuration. Examples of the types of thermal input which can be used are electrical resistance or warm gas heating. More particularly, electric heating coil 60 can be connected to the flexural member 34 and electrical heating coils 62 can be connected to flexural member 32. In contrast, warm gas can be selectively introduced to a flexural member. The other non-heated, flexural member 34 in this example, is still in the low strength martensitic phase and bends to follow the pivoting motion.

The present invention can then be rotated to its other extreme position by chilling flexural member 32 to return it to the martensitic phase and then warming flexural member 34. Cool gas can be selectively introduced to the flexural member to effect the chilling.

If intermediate angular positions other than the initial middle-of-the-range position are required, mechanical stops may be added.

If only one intermediate position is required, the angular position resulting from balanced forces with all flexural members 32 and 34 in the low-strength martensitic phase can be biased away from the middle of the range by making the flexural members 32 and 34 of slightly different thicknesses. This would not greatly affect the operation of the flexural pivot device 42, because the force tending to restore the "remembered" configuration is about ten times as great as the force required to produce further bending.

Alternate embodiments of the present invention include other "shape-memory" alloys, such as those having a copper base which have less resistance to atmospheric corrosion, lower strength and lower allowable deformation than the Nitinol. However, copper base alloys allow the two flexural forces to be additive in either direction, which might be desirable in a clamping or gripping application. The copper-base alloys are also less expensive.

Therefore, in comparison with the prior art flexural pivot devices, the present invention includes a flexural pivot device having a set of flexural members, preferably equivalent in size to traditional flexural members, for convenience in selection. Each flexural pivot device, however, is considerably stronger relative to static loading than the equivalently sized, traditional, flexural pivot device. In addition, the allowable cyclic loading is much greater than that of the equivalently sized, conventional, flexural pivot device because the allowable loading need not be reduced to compensate for the fatigue strength decreasing as the number of cycles is increased.

In addition to using the flexural members of the present invention to form flexural pivot devices as discussed above, there are many other applications of the present invention, wherein the flexural members can provide a remotely operated rotational device. For example, the device can be used as a thermally activated, rotational positioner in an inaccessable environment, e.g., a nuclear reactor. Functions which can be performed by the shape memory flexural members of the present invention also include: rotation of latch components; rotation of an unloaded breech-lock assembly; flexure of joint pivots of a linkage to provide positioning of a component carried by the linkage; and closing or opening of grippers.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention and the appended claims and their equivalents.

I claim as my invention:

1. A flexural pivot device, comprising:
    (a) a first, stationary tubular member;
    (b) a second, movable tubular member arranged coaxially and partially within the first tubular member for rotational movement relative thereto;
    (c) first and second spring members formed from a shape memory alloy into a first, curved configuration in the austenitic phase at a first temperature, cooled into the martensitic phase at a second, relatively lower temperature, formed into a second, flat configuration and connected between and within the first and second tubular members coaxially thereof; and
    (d) means, operatively connected to the first and second spring members, for selectively recreating the first temperature, returning the first and second spring members to the first, curved configuration in the austenitic phase and rotating the second tubular member relative to the first tubular member.

2. The deivce as recited in claim 1, wherein the shape memory alloy comprises nickel and titanium.

3. The device as recited in claim 1, further comprising: a third spring member formed from a shape memory alloy into a first, curved configuration in the austenitic phase at a first temperature, cooled into the martensitic phase at a second, relatively lower temperature, formed into a second, flat configuration and connected between and within the first and second tubular members coaxially thereof and positioned between the first and second spring members.

4. The device as recited in claim 3, wherein the means for recreating the first temperature is also connected to the third spring element and comprises electrical heating coils connected to the first, second and third spring elements.

* * * * *